(12) United States Patent
Deguchi et al.

(10) Patent No.: US 7,070,101 B2
(45) Date of Patent: Jul. 4, 2006

(54) LOOP ANTENNA AND CONTACTLESS IC CARD READ/WRITE APPARATUS

(75) Inventors: Futoshi Deguchi, Fukuoka (JP); Hiroshi Yoshinaga, Kasuya-gun (JP); Masahiko Tanaka, Fukuoka (JP); Hiroaki Haruyama, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 13 days.

(21) Appl. No.: 10/885,723

(22) Filed: Jul. 8, 2004

(65) Prior Publication Data

US 2005/0006473 A1 Jan. 13, 2005

(30) Foreign Application Priority Data

Jul. 10, 2003 (JP) .............................. 2003-195054

(51) Int. Cl.
*G06K 7/08* (2006.01)
(52) U.S. Cl. ...................... 235/451; 235/450; 235/449; 343/787; 343/788; 343/842; 343/872
(58) Field of Classification Search ................ 343/842, 343/742, 787, 788, 872; 235/449, 451
See application file for complete search history.

(56) References Cited

U.S. PATENT DOCUMENTS 2,419,480 A 4/1947 Bryan et al.
4,890,115 A 12/1989 Hartings
5,568,162 A 10/1996 Samsel et al.
6,215,455 B1 4/2001 D'Angelo et al.
6,637,665 B1 10/2003 Salzgeber

FOREIGN PATENT DOCUMENTS

JP 2001 326526 11/2001
WO 0189034 A1 11/2001

OTHER PUBLICATIONS

International Search Report dated Oct. 20, 2004.
Written Opinion of the ISA dated Oct. 20, 2004.

*Primary Examiner*—Michael G. Lee
*Assistant Examiner*—Kristy A. Haupt
(74) *Attorney, Agent, or Firm*—Stevens, Davis, Miller & Mosher, LLP

(57) ABSTRACT

To provide a loop antenna capable of attenuating the distant electric field with the attenuation of the magnetic flux in the vicinity of an electromagnetic wave restrained, and a contactless IC card read/write apparatus.

A loop antenna 10 has an electromagnetic wave shield 1 over at least one side of the loop antenna, the electromagnetic wave shield 1 comprising a plurality of electric conductors 2, a ground contact 3 for grounding the plurality of electric conductors and a lead wire 4 for connecting the plurality of electric conductors 2 to the ground contact 3. The plurality of electric conductors 2 are electrically connected via the lead wire 4 to the ground contact 3 and the plurality of electric conductors 2 are arranged so that the paths of the respective electric conductors 2 from any of their given points to the ground contact 3 via the lead wire 4 are determined uniformly.

15 Claims, 18 Drawing Sheets

LOOP ANTENNA AND CONTACTLESS IC CARD READ/WRITE APPARATUS

CROSS REFERENCE TO RELATED APPLICATION

This application is based upon and claims the benefit of priority of Japanese Patent Application No2003-195054 filed on Jul. 10, 2003, the contents of which are incorporated herein by reference in its entirety.

BACKGROUND OF THE INVENTION

1. Field of the Invention

The present invention relates to a loop antenna for receiving data from a contactless IC card through load changes by supplying electric power and transmitting data to the contactless IC card and to a contactless IC card read/write apparatus, and more particularly, the invention relates to a loop antenna capable of attenuating the distant electric field with the attenuation of the magnetic flux in the vicinity of an electromagnetic wave restrained and to a contactless IC card read/write apparatus.

2. Description of the related art

Reader/Writer systems using contactless IC cards are generally called a contactless IC card system and have heretofore been put into practical use for physical distribution systems, traffic systems and air cargo control systems utilizing a frequency band of 13.56 MHz, for example. The reader/writer system is provided with a contactless IC card having an IC chip and an antenna coil on one sheet of plastic card and a read/write apparatus for communicating with the contactless IC card, the read/write apparatus having a loop antenna. The loop antenna is used for regularly or intermittently supplying electric power and transmitting data and for receiving data from the contactless IC card within such a range as to receive the electric power and the transmitting data Incidentally, though high-frequency magnetic flux is utilized for communication in the reader/writer system, a high-frequency electric field other than the high-frequency magnetic flux is to be also emitted when the antenna for communication is driven. The intensity of the high-frequency electric field is regulated by the Radio Law and measures have been taken to lower the output of the antenna in order to satisfy the Law; in this case, however, there has developed a problem of decreasing the communication distance. As another measure, it has been arranged to dispose a shield plate around the antenna.

FIG. 19 is a schematic perspective view of a conventional contactless IC card read/write apparatus. Tn (JP-A-2001-326526), for example, disclosed is a shield antenna coil 33 essentially consisting of electric-field shield patterns 31 and a power-supply pattern coil 32. The electric-field shield patterns 31 are wide enough to cover the power-supply pattern coil 32. The electric-field shield patterns 31 are in the form of an open loop in order to prevent the generation of an eddy current as an obstacle to the radiation of the magnetic flux component and so disposed as to cover the power-supply pattern coil 32, the electric-field shield patterns 31 being grounded as shown in FIG. 19. With this arrangement, while the magnetic flux component required for communication is secured, it is indicated that the electric-field component caused to disturb the communicating operation of any other wireless installation is made reducible thereby.

However, though the constitution of the conventional contactless IC card read/write apparatus allows the electric field to be reduced, the attenuation of the neighboring magnetic flux required for communication tends to grow greater and the problem is that the communication distance becomes extremely shortened.

SUMMARY OF THE INVENTION

An object of the invention made to solve the problems above is to provide a loop antenna capable of attenuating the distant electric field with the attenuation of the magnetic flux in the vicinity of an electromagnetic wave restrained and a contactless IC card read/write apparatus.

In order to accomplish the object above, a loop antenna according to the invention has an electromagnetic wave shield over at least one side of the loop antenna, the electromagnetic wave shield comprising a plurality of electric conductors, a ground contact for grounding the plurality of electric conductors and a lead wire for connecting the plurality of electric conductors to the ground contact. The loop antenna is such that the plurality of electric conductors are electrically connected via the lead wire to the ground contact and that the plurality of electric conductors are arranged so that the paths of the respective electric conductors from any of their given points to the ground contact via the lead wire are determined uniformly.

A contactless IC card read/write apparatus according to the invention comprises the loop antenna according to the invention for supplying electric power and transmitting data to a contactless IC card by electromagnetic induction and receiving data from the contactless IC card through load changes, and a read/write apparatus connected to the loop antenna.

According to the invention, it is possible to provide a loop antenna capable of attenuating the distant electric field with the attenuation of the neighboring magnetic flux restrained because the magnetic coupling of the magnetic flux of the electromagnetic wave emitted from the loop antenna to the electromagnetic wave shield is reducible, and a contactless IC card read/write apparatus.

DESCRIPTION OF THE PREFERRED EMBODIMENTS

Figure 1:
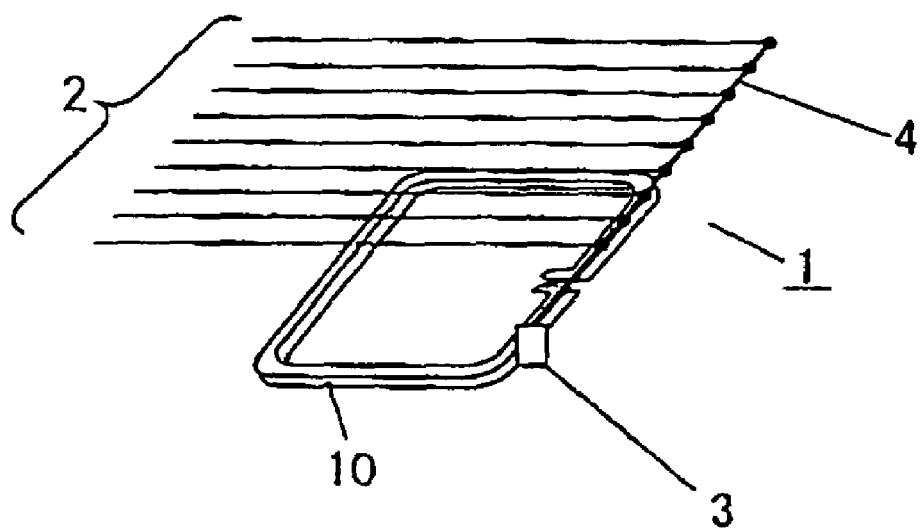
FIG. 1(a) is a schematic perspective view of a loop antenna having an electromagnetic wave shield according to Embodiment 1 of the invention.
FIG. 1(b) a schematic sectional view of the loop antenna having the electromagnetic wave shield according to Embodiment 1 thereof.
Figure 1:
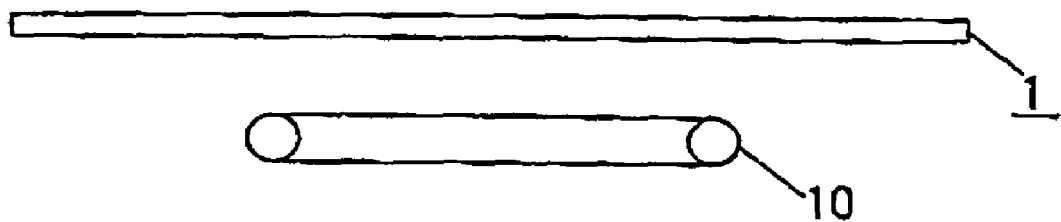

The invention is a loop antenna having an electromagnetic wave shield over at least one side of the loop antenna, the electromagnetic wave shield comprising a plurality of electric conductors, a ground contact for grounding the plurality of electric conductors and a lead wire for connecting the plurality of electric conductors to the ground contact. The loop antenna is characterized in that the plurality of electric conductors are electrically connected via the lead wire to the ground contact and that the plurality of electric conductors are arranged so that the paths of the respective electric conductors from any of their given points to the ground contact via the lead wire are determined uniformly. As the magnetic coupling of the magnetic flux in the vicinity of the electromagnetic wave emitted from the loop antenna to the electromagnetic wave shield is reducible, the distant electric field can be attenuated with the attenuation of the neighboring magnetic flux restrained.

The invention is a loop antenna having an electromagnetic wave shield over at least one side of the loop antenna, the electromagnetic wave shield comprising a plurality of electric conductors, a ground contact for grounding the plurality of electric conductors and a lead wire for connecting the plurality of electric conductors to the ground contact. The loop antenna is characterized in that the plurality of electric conductors are connected via the lead wire to the ground contact through such an electric connection as not to form a closed loop structure. As the magnetic coupling of the magnetic flux in the vicinity of the electromagnetic wave emitted from the loop antenna to the electromagnetic wave shield is reducible, the distant electric field can be attenuated with the attenuation of the neighboring magnetic flux restrained.

The invention is the loop antenna, characterized in that the plurality of electric conductors, the ground contact and the lead wire of the electromagnetic wave shield are provided on a support plate, whereby the loop antenna is easy to handle.

The invention is the loop antenna, characterized in that the plurality of electric conductors of the electromagnetic wave shield are covered with insulating material, whereby the electric insulation characteristics between the electric conductors can be held even in case that the plurality of electric conductors intersect each other.

The invention is the loop antenna, characterized in that the plurality of electric conductors of the electromagnetic wave shield are comb-shaped, reticulated or latticed, whereby the distant electric field can efficiently be attenuated with the attenuation of the neighboring magnetic flux restrained.

The invention is the loop antenna, characterized in that the electromagnetic wave shield is envelop-shaped, whereby the distant electric field can be attenuated omnidirectionally with the attenuation of the neighboring magnetic flux restrained.

The invention is the loop antenna, characterized in that the electromagnetic wave shield is multi-layered, whereby the distant electric field can efficiently be attenuated with the attenuation of the neighboring magnetic flux restrained.

The invention is the loop antenna, characterized in that the plurality of electric conductors of the electromagnetic wave shield are so disposed as to wrap up the loop antenna, whereby the distant electric field can be attenuated substantially omnidirectionally with the attenuation of the neighboring magnetic flux restrained.

The invention is the loop antenna, characterized in that a sheet of magnetic material is disposed at the back of the loop antenna facing the electromagnetic wave shield, whereby a magnetic flux loop (closed circuit) can efficiently be formed.

The invention is the loop antenna, characterized in that a side wall in a standing condition on the loop antenna side is provided to the sheet of magnetic material, whereby the magnetic flux loop (closed circuit) can be formed further efficiently.

The invention is the loop antenna, characterized in that a metal plate is disposed at the back of the sheet of magnetic material, whereby the restriction of the installation place of the antenna, especially the influence of metal can be reduced by conducting the matching of the antenna beforehand in this condition.

The invention is the loop antenna, characterized in that a side wall in a standing condition on the loop antenna side is provided to the metal plate, whereby mechanical strength is increased because a flexible sheet of magnetic material can be held.

The invention is the loop antenna, characterized in that a plurality of through-holes are provided in the metal plate, whereby the loop antenna can be made lightweight.

The invention is the loop antenna, characterized in that the ground contact of the electromagnetic wave shield is connected to the ground of the loop antenna, whereby a degree of design freedom is enhanced by causing the ground connection to be shared in common so as to make wire stringing and the like less complicated.

The invention is a loop antenna characterized in that an electromagnetic wave shield is provided with a plurality of electric conductors so arranged that the paths of the respective electric conductors from any of their given points to a ground contact are determined uniformly. As the magnetic coupling of the magnetic flux in the vicinity of the electromagnetic wave emitted from the loop antenna to the electromagnetic wave shield is reducible, the distant electric field can be attenuated with the attenuation of the neighboring magnetic flux restrained.

The invention is a loop antenna characterized in that an electromagnetic wave shield is provided with a plurality of electric conductors so arranged that the electric conductors are connected to a ground contact through such an electric connection as not to form a closed loop structure. As the magnetic coupling of the magnetic flux in the vicinity of the electromagnetic wave emitted from the loop antenna to the electromagnetic wave shield is reducible, the distant electric field can be attenuated with the attenuation of the neighboring magnetic flux restrained.

The invention is the loop antenna, characterized in that the plurality of electric conductors are comb-shaped, reticulated or latticed, whereby the distant electric field can efficiently be attenuated with the attenuation of the neighboring magnetic flux restrained.

The invention is a contactless IC card read/write apparatus characterized by the loop antenna for supplying electric power and transmitting data to a contactless IC card by electromagnetic induction and receiving data from the contactless IC card through load changes and a read/write apparatus connected to the loop antenna. As the magnetic coupling of the magnetic flux in the vicinity of the electromagnetic wave emitted from the loop antenna to the electromagnetic wave shield is reducible, the distant electric field can be attenuated with the attenuation of the neighboring magnetic flux restrained.

The invention is the contact less IC card read/write apparatus, characterized in that the read/write apparatus is disposed within the opening of the loop antenna and housed in a casing, whereby the contactless IC card read/write apparatus integrated with the loop antenna is materializable, which apparatus is easy to handle and can be installed in any place without restriction.

The invention is the contactless IC card read/write apparatus, characterized in that the read/write apparatus and the loop antenna are disposed next to each other and housed in a casing, whereby the contactless IC card read/write apparatus integrated with the loop antenna is materializable, which apparatus is easy to handle and can be installed in any place without restriction.

The invention is a contactless IC card read/write apparatus comprising a loop antenna for supplying electric power and transmitting data to a contactless IC card by electromagnetic induction and receiving data from the contactless IC card through load changes and a read/write apparatus connected to the loop antenna, characterized in that an electromagnetic wave shield is disposed in the direction in which the loop antenna communicates with the contactless IC card and arranged so that paths of a plurality of electric conductors from any of their given points to a ground contact are determined uniformly. As the magnetic coupling of the magnetic flux in the vicinity of the electromagnetic wave emitted from the loop antenna to the electromagnetic wave shield is reducible, the distant electric field can be attenuated with the attenuation of the neighboring magnetic flux restrained.

The invention is a contactless IC card read/write apparatus comprising a loop antenna for supplying electric power and transmitting data to a contactless IC card by electromagnetic induction and receiving data from the contactless IC card through load changes and a read/write apparatus connected to the loop antenna, characterized in that an electromagnetic wave shield is disposed in the direction in which the loop antenna communicates with the contactless IC card and arranged so that a plurality of electric conductors are connected to a ground contact through such an electric connection as not to form a closed loop structure. As the magnetic coupling of the magnetic flux in the vicinity of the electromagnetic wave emitted from the loop antenna to the electromagnetic wave shield is reducible, the distant electric field can be attenuated with the attenuation of the neighboring magnetic flux restrained.

A description will now be given of embodiments of the invention by using the drawings 1 to 17.

Incidentally, contactless IC cards according to the invention are defined as those which are not limited to so-called cards but include radio communication media capable of communicating with read/write apparatus in a contactless condition such as those called IC tags, ID tags and identification labels depending on the use.

EMBODIMENT 1

FIG. 1(*a*) is a schematic perspective view of a loop antenna having an electromagnetic wave shield according to Embodiment 1 of the invention and FIG. 1(*b*), a schematic sectional view of the loop antenna having the electromagnetic wave shield according to Embodiment 1 thereof.

In FIG. 1, reference numeral 1 denotes an electromagnetic wave shield; 2, electric conductors; 3, a ground contact; 4, a lead wire; and 10, a loop antenna.

As shown in FIG. 1(*a*) and FIG. 1(*b*), the comb-shaped electromagnetic wave shield 1 is disposed in front of the loop antenna 10. In this case, the front of the loop antenna 10 is the upper side in FIG. 1(*b*), that is, the communicating direction of a radio communication medium such as a contactless IC card.

The electromagnetic wave shield 1, which will be described in detail later, comprises the plurality of electric conductors 2, the ground contact 3 for grounding the plurality of electric conductors 2 and the lead wire 4 for connecting the plurality of electric conductors 2 to the ground contact 3. Black round marks in FIG. 1(*a*) indicate that the electric conductors 2 are electrically connected. Consequently, any other portion where the plurality of electric conductors 2 intersect each other and where the black round marks are absent refers to a state in which the electric conductors are not electrically connected but insulated from each other. Although not shown in FIG. 1(*a*), the ground contact 3 is connected to the ground of the loop antenna 10.

The electromagnetic wave shield 1 is disposed over at least one side (in front in this case) of the loop antenna 10, whereby the intensity of the distant electric field is made reducible by restraining the neighboring magnetic flux in front of the loop antenna 10.

EMBODIMENT 2

Figure 2:
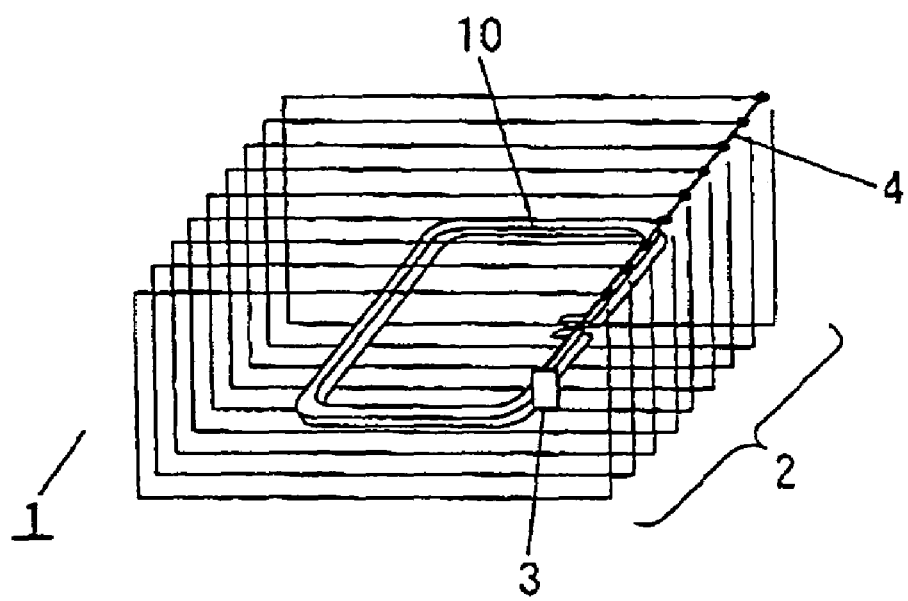
FIG. 2(a) is a schematic perspective view of a loop antenna having an electromagnetic wave shield according to Embodiment 2 of the invention.
FIG. 2(b) is a schematic sectional view of the loop antenna having the electromagnetic wave shield according to Embodiment 2 thereof.
Figure 2:
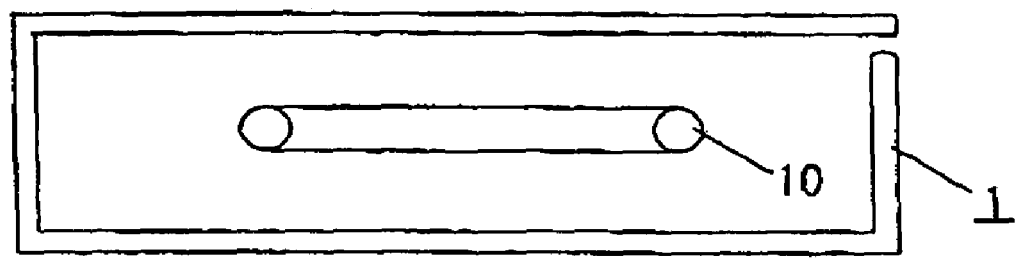

FIG. 2(*a*) is a schematic perspective view of a loop antenna having an electromagnetic wave shield according to Embodiment 2 of the invention and FIG. 2(*b*), a schematic sectional view of the loop antenna having the electromagnetic wave shield according to Embodiment 2 thereof.

According to Embodiment 2 of the invention, the electromagnetic wave shield 1 is so disposed as to wrap up the front, side and back of the loop antenna 10 as shown in FIG. 2(*a*) and FIG. 2(*b*). The attenuation of the neighboring magnetic flux is restrained over the whole direction of the loop antenna 10 by disposing the electromagnetic wave shield 1 so as to wrap up the loop antenna 10 like this, so that the intensity of the distant electric field can be reduced.

EMBODIMENT 3

Figure 3:
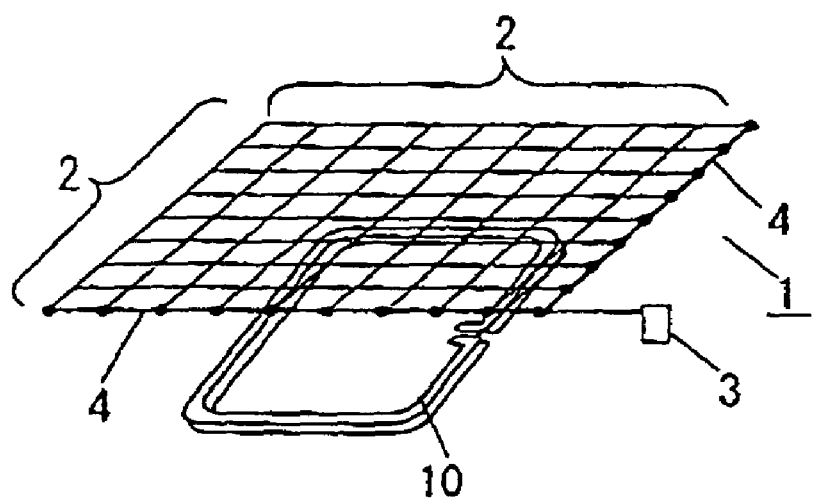
FIG. 3(a) is a schematic perspective view of a loop antenna having an electromagnetic wave shield according to Embodiment 3 of the invention.
FIG. 3(b) is a schematic sectional view of the loop antenna having the electromagnetic wave shield according to Embodiment 3 thereof.
Figure 3:
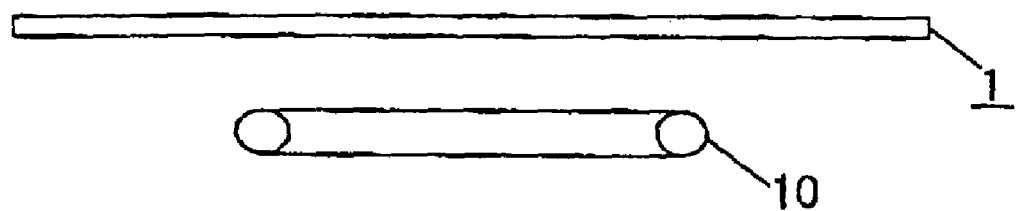

FIG. 3(*a*) is a schematic perspective view of a loop antenna having an electromagnetic wave shield according to Embodiment 3 of the invention and FIG. 3(*b*), a schematic sectional view of the loop antenna having the electromagnetic wave shield according to Embodiment 3 thereof.

According to Embodiment 3 of the invention, the reticulated (latticed) electromagnetic wave shield 1 is disposed in front of the loop antenna 10.

Thus, use can be made of the comb-shaped electromagnetic wave shield 1 as shown in Embodiments 1 and 2 of the invention and besides the reticulated (latticed) one as shown in Embodiment 3 thereof. Further, the electromagnetic wave shield 1 may be in a radial form.

(Description of Electromagnetic Wave Shield)

The electromagnetic wave shield 1 shown in Embodiments 1–3 will now be described in more detail.

Figure 4:
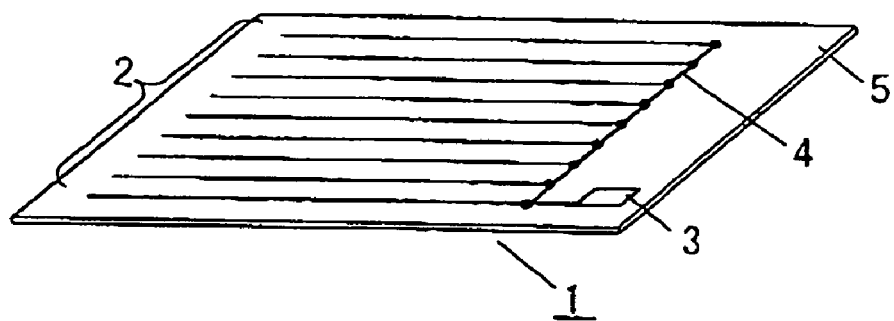
FIG. 4(a) is a schematic perspective view of an electromagnetic wave shield according to an embodiment of the invention.
FIG. 4(b) is a schematic perspective view of an electromagnetic wave shield according to an embodiment of the invention.
Figure 4:
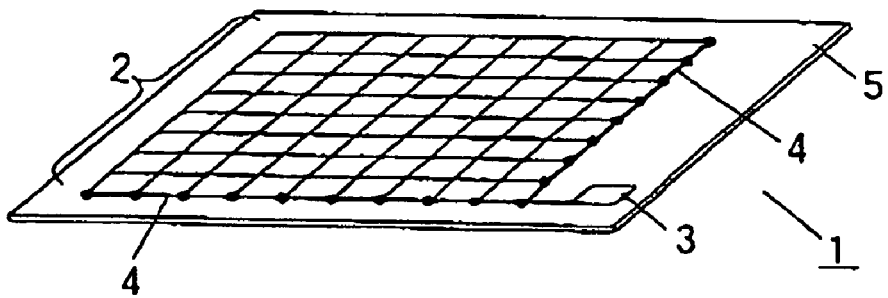

FIG. 4(*a*) is a schematic perspective view of an electromagnetic wave shield embodying the invention; reference numeral 5 in FIG. 4 denotes a support plate.

As shown in FIG. 4(*a*), the electromagnetic wave shield 1 comprises the plurality of electric conductors 2; the ground contact 3 for grounding the plurality of electric conductors 2; the lead wire 4 for connecting the plurality of electric conductors 2 and the ground contact 3; and the support plate 5 for holding the plurality of electric conductors 2, the ground contact 3 and the lead wire 4, the plurality of electric conductors 2 being comb-shaped.

The black round marks in FIG. 4 indicate that the electric conductors 2 are electrically connected. Consequently, any other portion where the plurality of electric conductors 2 intersect each other and where the black round marks are absent refers to a state in which the electric conductors are not electrically connected but insulated from each other.

As shown in FIG. 4(*a*), each of the plurality of electric conductors 2 is brought into electrical contact with the lead wire 4 connected to the ground contact 3, which indicates that as seen from an electrical standpoint, paths to be followed along the respective electric conductors 2 from any of their given points to the ground contact 3 are determined uniformly as far as any one of the electric conductors 2 is concerned; by this is meant that no closed loop is formed with each of the electric conductors 2 or the individual electric conductors electrically connected together.

The plurality of electric conductors 2 and the lead wire 4 may be brought into electrical contact with each other by soldering, for example. Further, a copper wire without any insulating coating may be used for the lead wire 4 so that it is readily soldered to the plurality of electric conductors 2. The lead wire 4 excluding the joint between the lead wire and the plurality of electric conductors may be provided with the insulating coating.

The ground contact 3 is a contact for obtaining the electric connection with the ground of the loop antenna 10. It is only needed for the ground contact 3 to make an electric connection with the ground of the loop antenna 10 and there are a mechanical method, a soldering method and the like for the above purpose; therefore, an arrangement corresponding to an applicable method should be made.

The plurality of electric conductors 2, the lead wire 4 and the ground contact 3 are fixed onto the support plate 5 by adhesive bonding, so that the electromagnetic wave shield 1 can be formed.

The electromagnetic wave shield 1 becomes easy to handle by providing the support plate 5 and a flexible substrate is employed for the support plate 5 to make the support plate flexible. Consequently, the electromagnetic wave shield 1 can readily be mounted in various casings different in shape.

Further, the method of fixing the component parts onto the support plate 5 is not limited to the adhesive bonding method but may be a method of tying up the electric conductors 2 on the support plate 5, for example. With tying pins thus provided, the electromagnetic wave shield 1 can be formed by fixedly winding the plurality of electric conductors 2 on the tying pins. At this time, there is no problem cropping up about arranging the plurality of electric conductors 2 on condition that as seen from an electrical standpoint, paths to be followed along the respective electric conductors 2 from any of their given points to the ground contact 3 are determined uniformly as far as any one of the electric conductors 2 is concerned and that no closed loop is formed with each of the electric conductors 2 or the individual electric conductors electrically connected together. Moreover, the electric conductors 2 may be formed by forming a metal film on the support plate 5 and patterning the film by chemical or physical etching.

With respect to the configuration of the electromagnetic wave shield, the plurality of electric conductors 2 may be reticulated (latticed) as shown in FIG. 4(*b*), which is a schematic perspective view of an electromagnetic wave shield according to an embodiment of the invention.

Even in the case of a plurality of reticulated (latticed) electric conductors 2 with the electric conductors 2 intersecting each other vertically and horizontally as shown in FIG. 4(*b*), there is no problem cropping up about arranging the plurality of electric conductors 2 on condition that as seen from an electrical standpoint, paths to be followed along the respective electric conductors 2 from any of their given points to the ground contact 3 are determined uniformly as far as any one of the electric conductors 2 is concerned and that no closed loop is formed with each of the electric conductors 2 or the individual electric conductors electrically connected together. In this case, the plurality of electric conductors 2 are insulated from each other at any position where the plurality of electric conductors 2 intersect each other other than the position on the lead wire 4.

Although the electromagnetic wave shield 1 is shown in FIG. 4(*a*) and FIG. 4(*b*) as what has been formed with the plurality of electric conductors 2, the ground contact 3 and the lead wire 4 arranged on the support plate 5, this arrangement is intended to make the electromagnetic wave shield 1 easy to handle by disposing it on the support plate 5. However, the support plate 5 is not necessarily required with respect to its influence on the characteristics of the electromagnetic wave shield 1.

Figure 5:
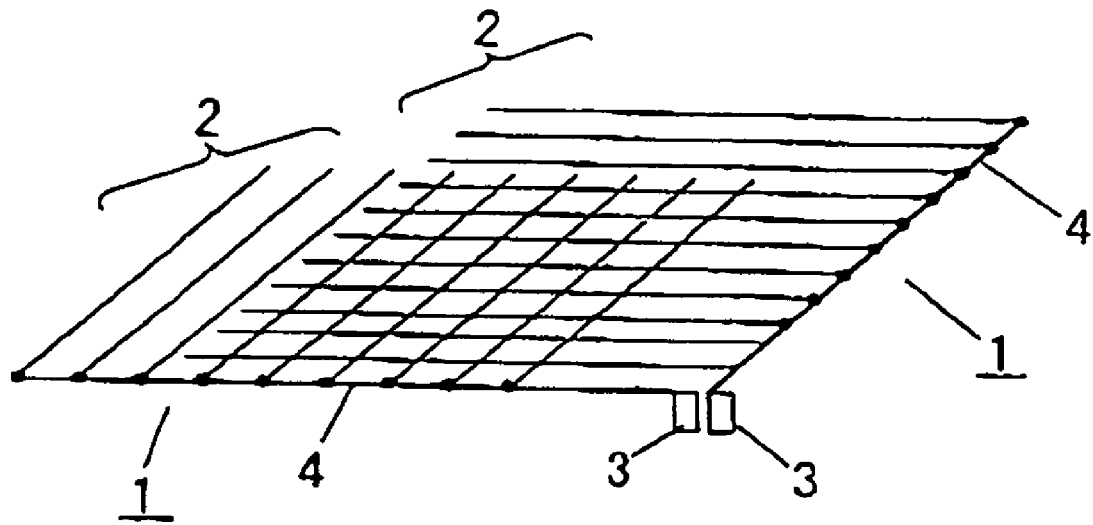
FIG. 5(a) is a schematic perspective view of an electromagnetic wave shield according to an embodiment of the invention.
FIG. 5(b) is a schematic perspective view of an electromagnetic wave shield according to an embodiment of the invention.
Figure 5:
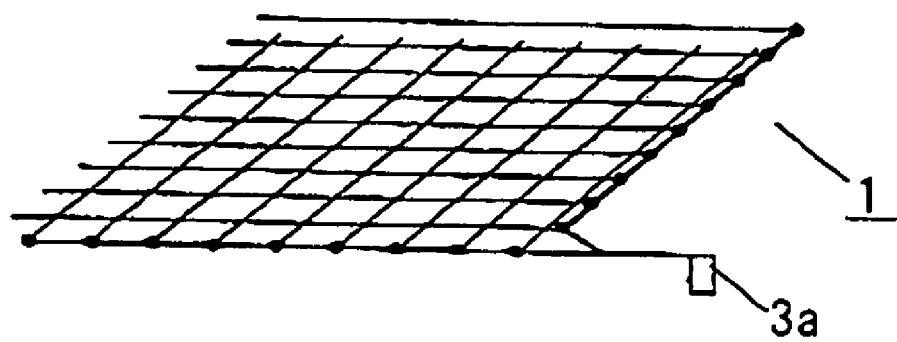

FIG. 5(*a*) and FIG. 5(*b*) are schematic perspective views of electromagnetic wave shields. As shown in FIG. 5(*a*), comb-shaped electromagnetic wave shields 1 are put on top of each other so that their electric conductors 2 intersect one another in order to produce a reticulated (latticed) electromagnetic wave shield as shown in FIG. 5(*b*).

In this case, their ground contacts 3 are joined together to make them a common ground contact 3*a* so as to establish the electric connection between the ground contact 3*a* and the ground of the loop antenna 10.

In case where the support plate 5 is not provided, the condition with the electromagnetic wave shields put on top of each other may be left intact as shown in FIG. 5(*b*); however, the formation of woven electric conductors would make the electromagnetic wave shield 1 easy to handle.

Although there has been shown a two-layer structure in the example of FIG. 5 wherein two comb-shaped electromagnetic wave shields 1 are stacked up, two or more layers of electromagnetic wave shields may be stacked up to form a three-layer or a four-layer structure.

Figure 6:
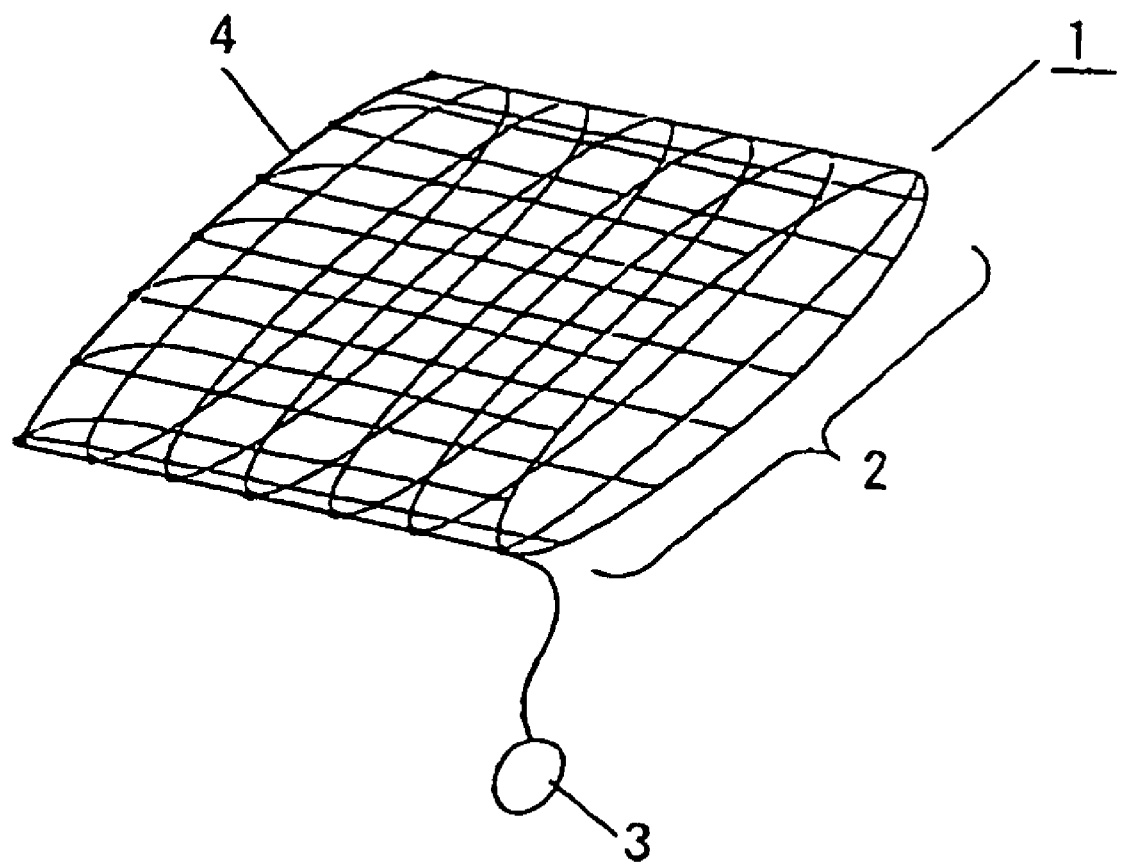
FIG. 6 is a schematic perspective view of an electromagnetic wave shield according to an embodiment of the invention.

As shown in FIG. 6, further, the electromagnetic wave shield 1 can be formed into a pouch. Since the electromagnetic wave is normally emitted in a three-dimensional form, the source of generating the electromagnetic wave is shielded three-dimensionally by forming the envelop-shaped electromagnetic wave shield. In other words, such an envelop-shaped electromagnetic wave shield is used to wrap up the loop antenna 10. FIG. 6 is a schematic perspective view of an electromagnetic wave shield according to an embodiment of the invention.

Figure 7:
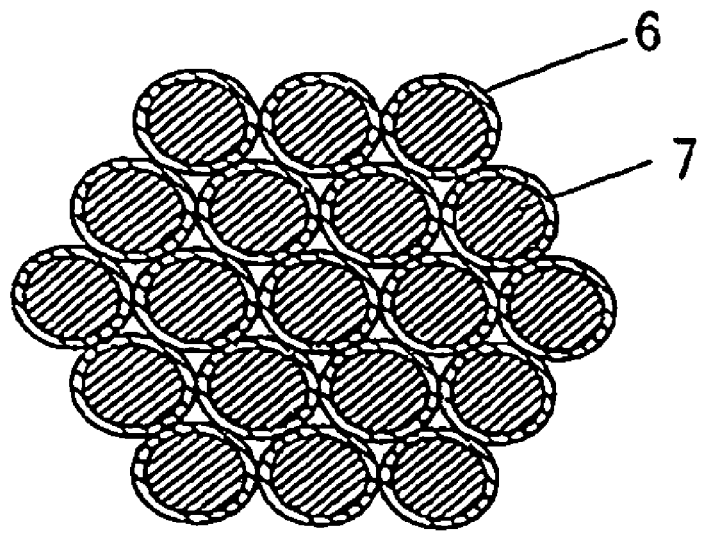
FIG. 7(a) is a sectional view of electric conductors of an electromagnetic wave shield according to an embodiment of the invention.
FIG. 7(b) is a sectional view of electric conductors of an electromagnetic wave shield according to an embodiment of the invention.
Figure 7:
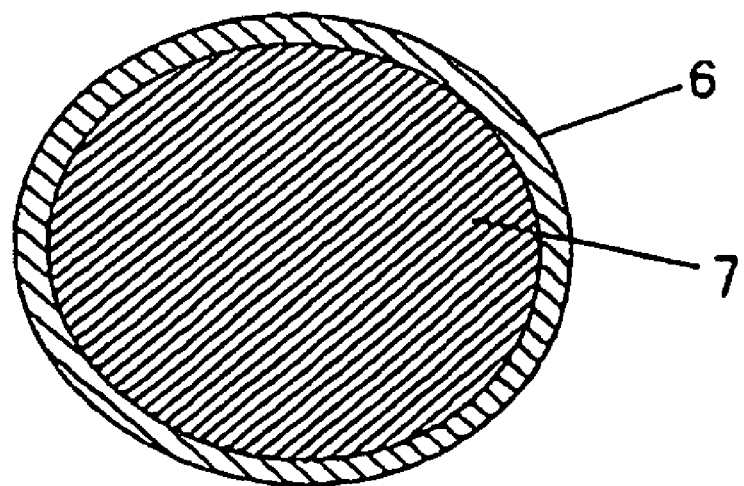

The electric conductors 2 will be described hereinbelow. FIG. 7(*a*) and FIG. 7(*b*) are sectional views of the electric conductors of an electromagnetic wave shield according to an embodiment of the invention. In FIG. 7, reference numeral 6 denotes an insulating coating; 7, copper material.

As shown in FIG. 7(*a*), a so-called litz wire prepared by twisting a plurality of small-gage wires with insulating coatings is usable for the electric conductor 2. As shown in FIG. 7(*b*), a single wire formed of the insulating coating 6 and the copper material 7 maybe used as the electric conductor 2. A description will be given below on the assumption that the litz wire shown in FIG. 7(*a*) and the single wire shown in FIG. 7(*b*) have substantially the same cross section.

The cross section of the optimum electric conductor 2 may be selected according to the frequency of an electromagnetic wave to be shielded. More specifically, the cross section of the electric conductor 2 is desired to be small when an electromagnetic wave has high frequency, whereas the cross section of the electric conductor 2 need not be made especially small when an electromagnetic wave has low frequency. When the cross section of the electric conductor 2 with an electromagnetic wave having high frequency is made smaller, it is conceivable that the effect of shielding the distant electric field is deteriorated; however, the problem of deteriorating the effect of shielding the distant electric field in this case can be solved when the cross section of the electric conductors 2 is decreased by using the so-called litz wire as an aggregate of small-gage wires having a small cross section or increasing the number of electric conductors 2 per area of the plurality of electric conductors 2. In other words, it is only necessary to determine not solely the cross section of the electric conductors 2 according to the frequency of the electromagnetic wave but also the surface density of the electric conductors 2 or the number of wires to be twisted for forming the litz wire so that the effect of shielding the distant electric field is optimized.

The cross sectional shape of small-gage wires constituting the litz wire as the electric conductors 2 or that of the single wire is substantially circular; however, the cross sectional shape is not limited to what is circular. However, provided that the link area between the electric conductors 2 forming the electromagnetic wave shield 1 and the neighboring magnetic flux is narrow and that the cross sectional shape is isotropic, the magnetic flux attenuates, irrespective of the incident direction of the electromagnetic wave. In addition to the electromagnetic wave that is directly incident on the electromagnetic wave shield 1 from the source of generating the electromagnetic wave, an electromagnetic wave incident after being reflected from objects surrounding the source of generating the electromagnetic wave tends to appear, depending on the place of installation of the electromagnetic wave shield 1. As the direction of incidence of the electromagnetic wave incident on the electromagnetic wave shield 1 after being reflected from objects surrounding the source of generating the electromagnetic wave becomes omnidirectional, it is desirous that the cross sectional shape of the electric conductors forming the electromagnetic wave shield 1 is isotropic.

In case that the cross sectional shape of small-gage wires constituting the litz wire as the electric conductors 2 or that of the single wire is not isotropic but flat, on the other hand, the degree of attenuation of the neighboring magnetic flux changes in the incident direction of the electromagnetic wave. In case that the cross sectional shape of the electromagnetic wave is not isotropic, the dimensions of the configuration of the electromagnetic wave have to be such that an eddy current is hardly generated in consideration of the frequency of an electromagnetic wave to be shielded when the dimension in the direction of the especially major axis of the electric conductors that are not isotropic.

Although insulating coating material has been appropriated to the insulating film 6 for obtaining insulating properties between the electric conductors 2, the selection of the coating material of the electric conductors 2 may be made such that the most suitable material is used according to the frequency of the target electromagnetic wave. When the frequency of the electromagnetic wave becomes higher, the insulating properties between the electric conductors 2 may lower because of the capacitive coupling between the electric conductors 2. In a case like this, the thickness or dielectric constant of the coating material should properly be chosen so that the electrical insulating properties can be maintained between the electric conductors 2.

Then, characteristic evaluation tests were carried out for the electromagnetic wave shield according to the invention.

EXAMPLE 1

As shown in the mode described in Embodiment 1 of the invention, that is, as shown in FIG. 1(a) and FIG. 1(b), a comb-shaped electromagnetic wave shield was disposed in front of a loop antenna. Conditions concerning evaluation tests are as follows: transmission output =1W, measuring distance to neighboring magnetic flux =30 cm, intensity measuring distance to distant electric field =3.5 m.

Comparative Example 1

Measurement was carried out under the same conditions as those in Example 1 except that the comb-shaped electromagnetic wave shield 1 was not disposed in front of the loop antenna 10.

The measured results of Example 1 together with those of Comparative Example 1 will be shown in (Table 1).

TABLE 1

|  | neighboring magnetic flux | intensity of lectric field |
| --- | --- | --- |
| Example 1 | −0.1 dB | −12.0 dB |
| Comparative example 1 | 0 dB (reference) | 0 dB (reference) |

As is obvious from Table 1, it was confirmed that the electromagnetic wave shield according to the invention was capable of reducing the intensity of the distant electric field while a reduction of the neighboring magnetic flux is restrained.

As the electromagnetic wave shield 1 according to the invention is so configured that as seen from an electrical standpoint, paths to be followed along the plurality of electric conductors 2 from any of their given points to the ground contact 3 are determined uniformly as far as any one of the electric conductors 2 is concerned and that no closed loop is formed with each of the electric conductors 2 or the individual electric conductors electrically connected together, the magnetic coupling of the neighboring magnetic flux induced by the loop antenna 10 to the electromagnetic wave shield 1 is restrained, which results in restraining not only the generation of an eddy current but also the attenuation of the neighboring magnetic flux. With respect to the intensity of the distant electric field, further, the attenuation of the intensity thereof is considered to be achievable because the electric conductors 2 are set to the ground potential.

EMBODIMENT 4

Figure 8:
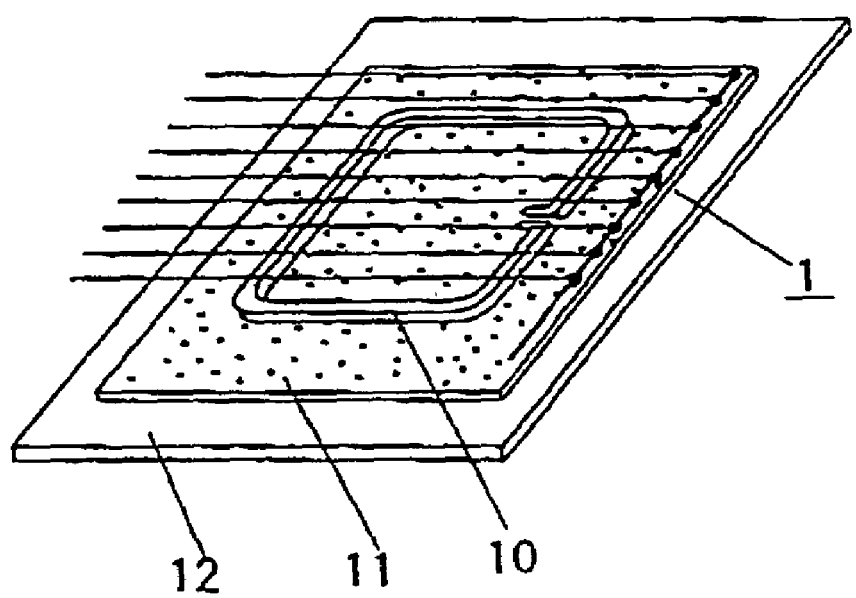
FIG. 8(a) is a schematic perspective view of a loop antenna having an electromagnetic wave shield, a sheet of magnetic material and a metal plate according to Embodiment 4 of the invention.
FIG. 8(b) is a schematic sectional view of the loop antenna having the electromagnetic wave shield, the sheet of magnetic material and the metal plate according to Embodiment 4 thereof.
Figure 8:
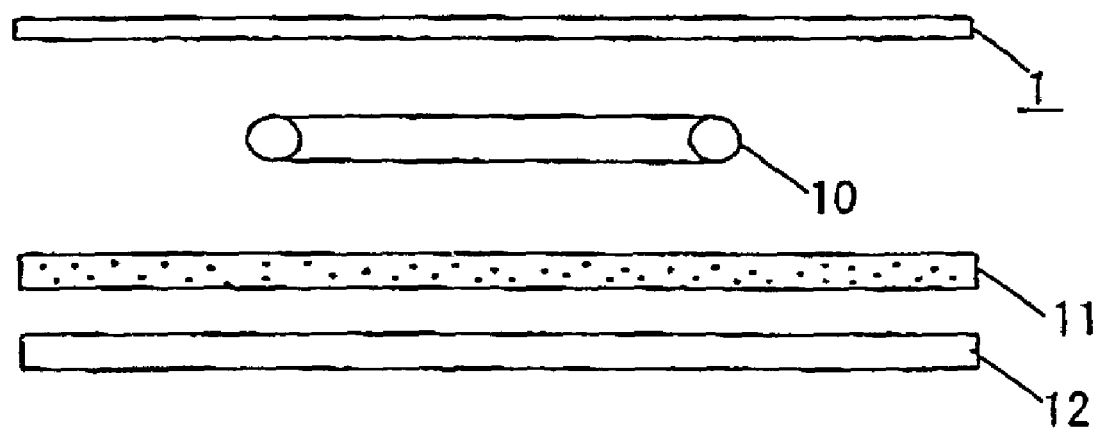

FIG. 8(a) is a schematic perspective view of a loop antenna having an electromagnetic wave shield, a sheet of magnetic material and a metal plate according to Embodiment 4 of the invention; and FIG. 8(b), a schematic sectional view of the loop antenna having the electromagnetic wave shield, the sheet of magnetic material and the metal plate according to Embodiment 4 thereof. In FIG. 8, reference numeral 11 denotes the sheet of magnetic material; and 12, the metal plate.

As shown in FIG. 8(a) and FIG. 8(b), the comb-shaped electromagnetic wave shield 1 is disposed in front of the loop antenna 10 as in the case of Embodiment 1 of the invention. According to Embodiment 4 of the invention, the sheet of magnetic material 11 is disposed at the back of the loop antenna and the metal plate 12 is disposed at the back of the sheet of magnetic material 11.

In this case, the front of the loop antenna 10 is the upper side of FIG. 8(b), that is, in the communicating direction of a radio communication medium such as a contactless IC card, whereas the back of the loop antenna 10 (or the sheet of magnetic material) is the underside of FIG. 8(b); in this direction, there exists a structure including, for example, a wall surface, supports of a gate and so forth where the loop antenna 10 is installed.

A magnetic material in the form of a sheet (or plate) as the quality of the material is employed for the sheet of magnetic material. As the magnetic material in the form of a sheet, the use of a sheet of magnetic material prepared by kneading powder of soft magnetic material in an organic coupling body such as resin material is preferred for weight reduction. Then the sheet of magnetic material 11 is disposed at the back of the loop antenna 10 whereby to concentrate a portion having high magnetic flux density in the sheet of magnetic material 11 right below the loop antenna 10, so that a magnetic flux loop can efficiently be formed.

Further, a flat plate of metal such as aluminum (Al), iron (Fe) and the like is usable for the metal plate 12. By making an impedance adjustment of the loop antenna 10 with the metal plate 12 existing beforehand, it is possible to reduce the influence of metal on the periphery where the loop antenna 10 is installed. Thus, the adjustment of the resonance frequency can be dispensed with because variation in the impedance of the loop antenna 10 and the deviation of the resonance frequency caused by the influence of the metal on the periphery of the installation place. Weight reduction can also be attempted by using the metal plate 12 having a plurality of through-holes as a so-called punching metal.

Thus, the electromagnetic wave shield 1 is disposed on at least one side (in front in this case) of the loop antenna 10, whereby the intensity of the distant electric field is reduced by restraining the neighboring magnetic flux in front of the loop antenna 10. The sheet of magnetic material 11 is also disposed at the back of the loop antenna 10 to increase the efficiency of the magnetic circuit and more over the metal plate 12 is disposed whereby to dispense with the adjustment of the resonance frequency since variation in the impedance of the loop antenna 10 and the deviation of the resonance frequency caused by the influence of the metal on the periphery of the installation place.

EMBODIMENT 5

Figure 9:
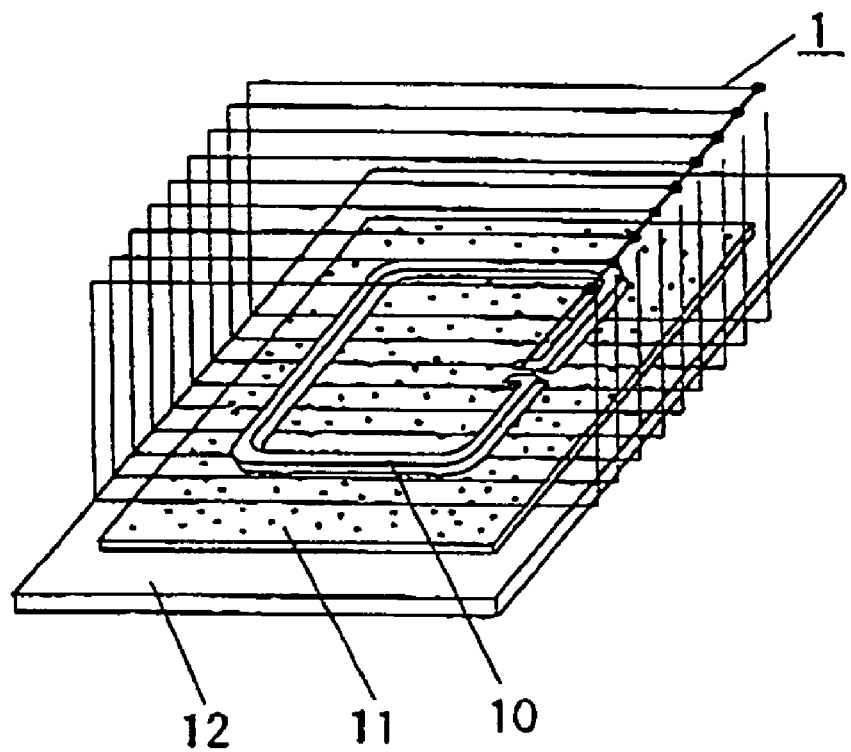
FIG. 9(a) is a schematic perspective view of a loop antenna having an electromagnetic wave shield, a sheet of magnetic material and a metal plate according to Embodiment 5 of the invention.
FIG. 9(b) is a schematic sectional view of the loop antenna having the electromagnetic wave shield, the sheet of magnetic material and the metal plate according to Embodiment 5 thereof.
Figure 9:
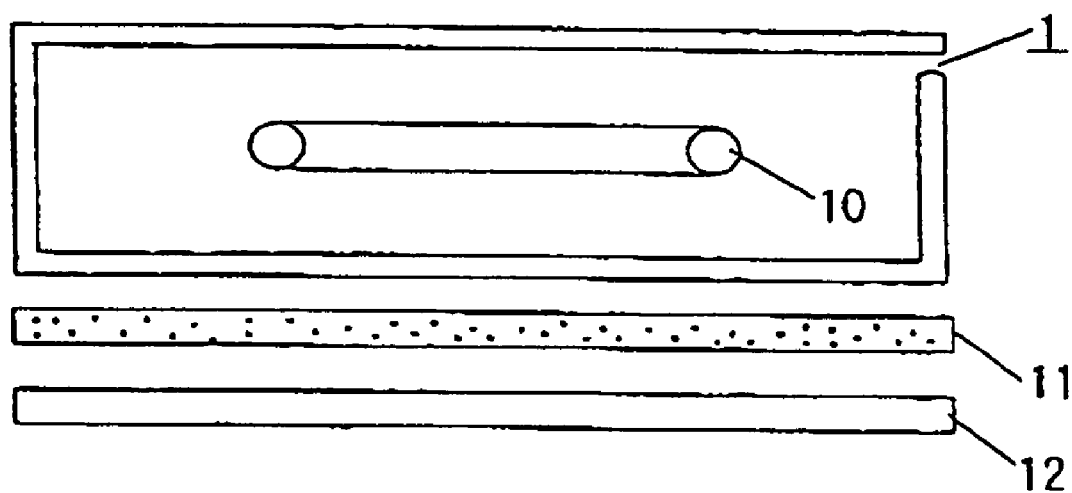

FIG. 9(*a*) is a schematic perspective view of a loop antenna having an electromagnetic wave shield, a sheet of magnetic material and a metal plate according to Embodiment 5 of the invention; and FIG. 9(*b*), a schematic sectional view of the loop antenna having the electromagnetic wave shield, the sheet of magnetic material and the metal plate according to Embodiment 5 thereof.

According to Embodiment 5 of the invention, the comb-shaped electromagnetic wave shield 1 is so disposed as to wrap up the front, side and back of the loop antenna 10 as shown in FIG. 9(*a*) and FIG. 9(*b*). As in the case of Embodiment 4 of the invention, the sheet of magnetic material 11 is disposed at the back of the loop antenna and the metal plate 12 is disposed at the back of the sheet of magnetic material 11. The electromagnetic wave shield 1 is disposed in a different fashion according to Embodiment 5 of the invention but the rest of the description, which is similar to that in Embodiment 4 thereof, will be omitted.

EMBODIMENT 6

Figure 10:
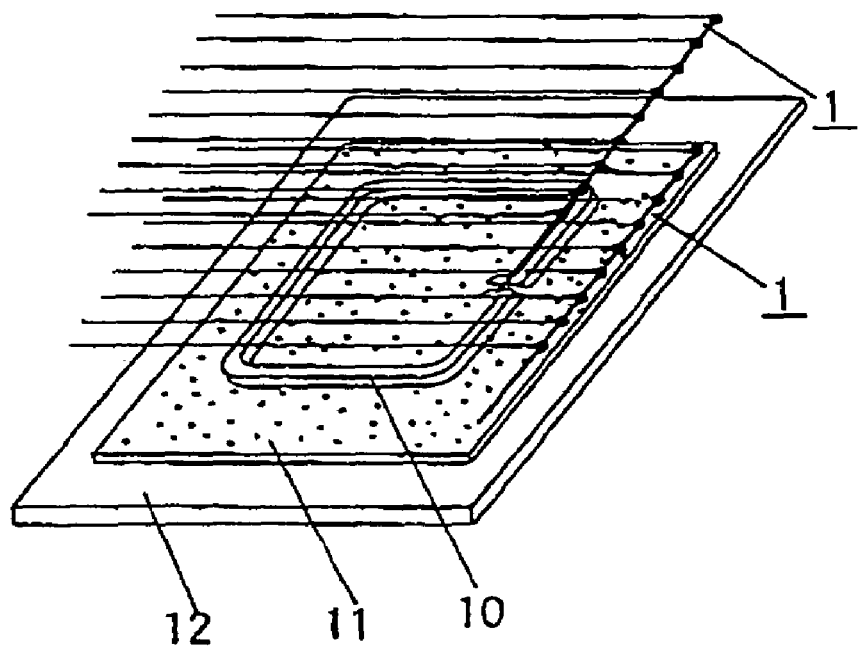
FIG. 10(a) is a schematic perspective view of a loop antenna having an electromagnetic wave shield, a sheet of magnetic material and a metal plate according to Embodiment 6 of the invention.
FIG. 10(b) is a schematic sectional view of the loop antenna having the electromagnetic wave shield, the sheet of magnetic material and the metal plate according to Embodiment 6 thereof.
Figure 10:
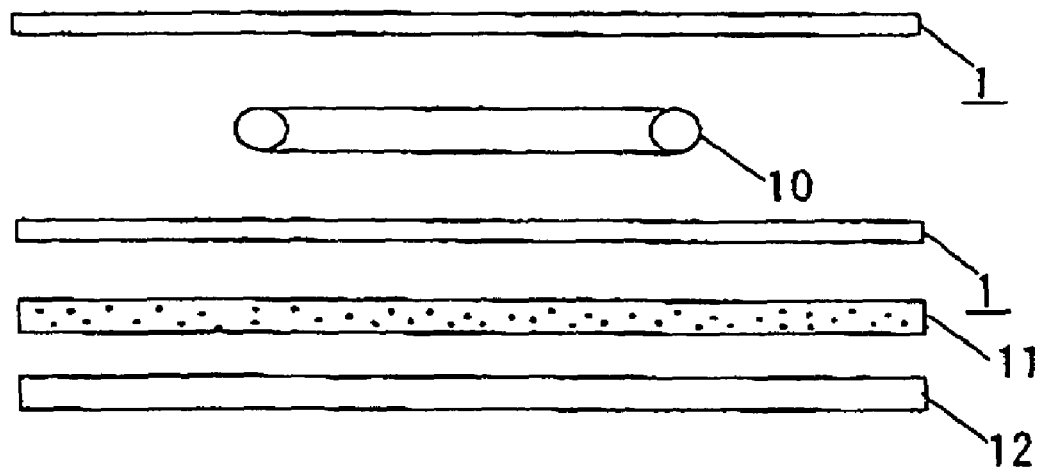

FIG. 10(*a*) is a schematic perspective view of a loop antenna having an electromagnetic wave shield, a sheet of magnetic material and a metal plate according to Embodiment 6 of the invention; and FIG. 10(*b*), a schematic sectional view of the loop antenna having the electromagnetic wave shield, the sheet of magnetic material and the metal plate according to Embodiment 6 thereof.

According to Embodiment 6 of the invention, the comb-shaped electromagnetic wave shield 1 is disposed in front and at the back of the loop antenna 10 as shown in FIG. 10(*a*) and FIG. 10(*b*). As in the case of Embodiment 4, the sheet of magnetic material 11 is disposed at the back of the loop antenna 10 and the metal plate 12 is disposed at the back of the sheet of magnetic material 11.

In Embodiment 6 of the invention, too, the electromagnetic wave shield 1 is disposed in a different fashion and the rest of the description is similar to that in Embodiment 4 thereof.

EMBODIMENT 7

Figure 11:
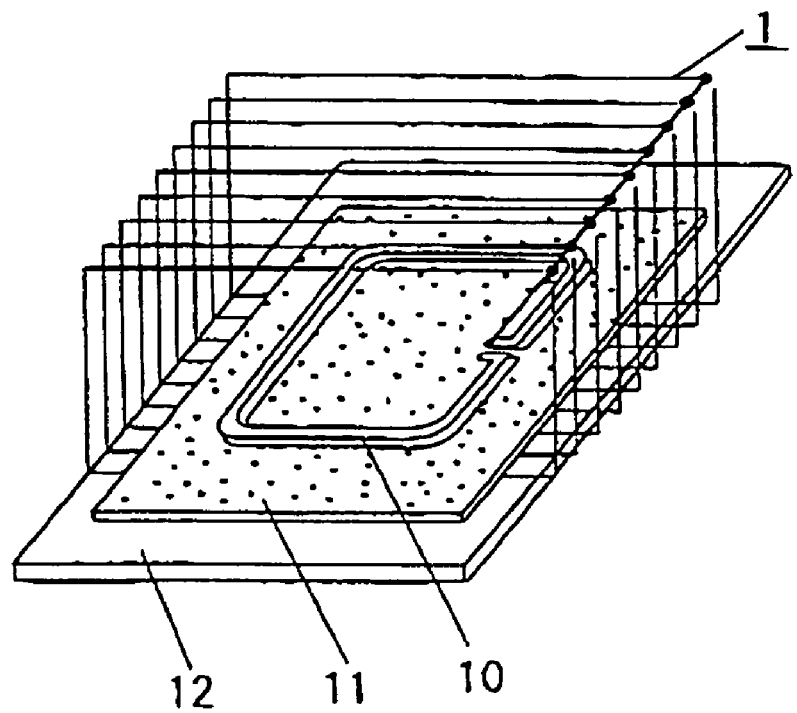
FIG. 11(a) is a schematic perspective view of a loop antenna having an electromagnetic wave shield, a sheet of magnetic material and a metal plate according to Embodiment 7 of the invention.
FIG. 11(b) is a schematic sectional view of the loop antenna having the electromagnetic wave shield, the sheet of magnetic material and the metal plate according to Embodiment 7 thereof.
Figure 11:
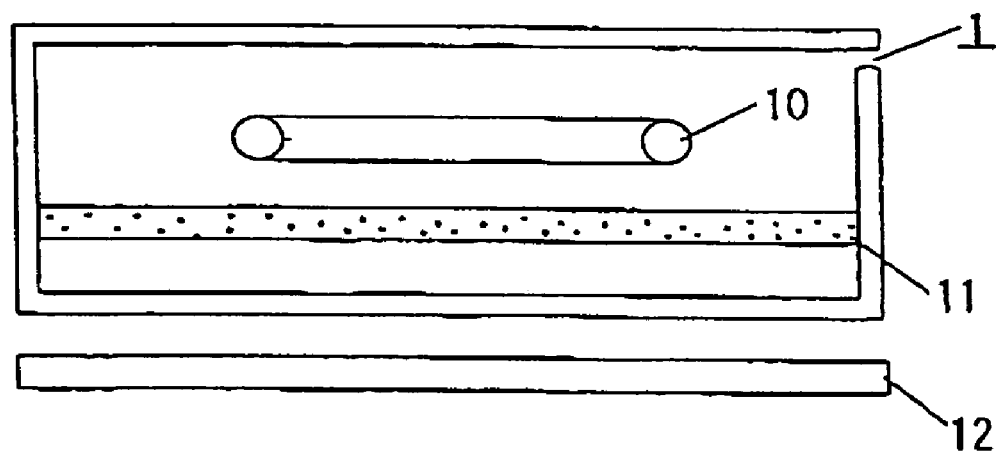

FIG. 11(*a*) is a schematic perspective view of a loop antenna having an electromagnetic wave shield, a sheet of magnetic material and a metal plate according to Embodiment 7 of the invention; and FIG. 11(*b*), a schematic sectional view of the loop antenna having the electromagnetic wave shield, the sheet of magnetic material and the metal plate according to Embodiment 7 thereof.

According to Embodiment 7 of the invention, the comb-shaped electromagnetic wave shield 1 is so disposed as to wrap up the loop antenna 10 and the sheet of magnetic material 11 as shown in FIG. 11(*a*) and FIG. 11(*b*). Further, the metal plate 12 is disposed at the back of the electromagnetic wave shield 1.

In Embodiment 7 of the invention, too, the electromagnetic wave shield 1 is disposed in a different fashion and the rest of the description is similar to that in Embodiment 4 thereof.

EMBODIMENT 8

Figure 12:
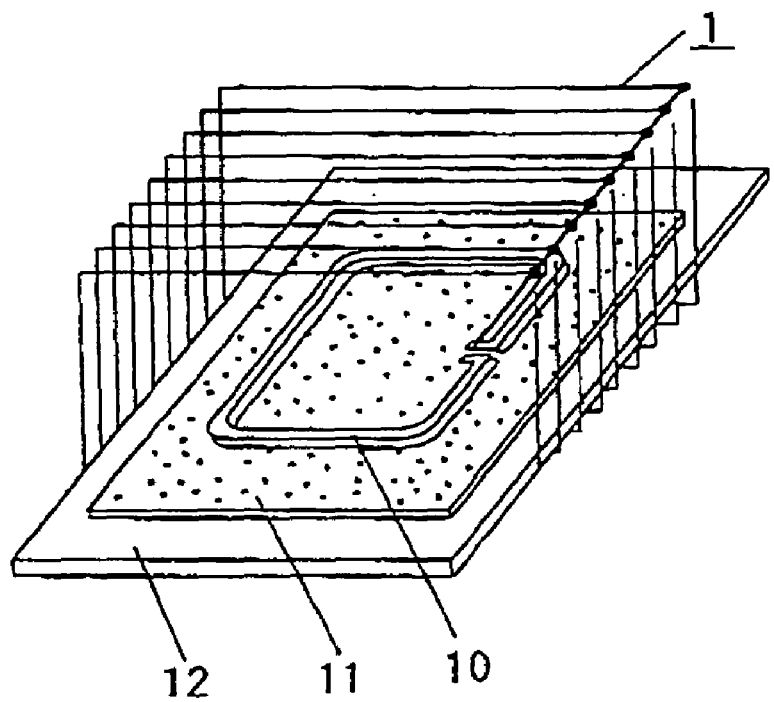
FIG. 12(a) is a schematic perspective view of a loop antenna having an electromagnetic wave shield, a sheet of magnetic material and a metal plate according to Embodiment 8 of the invention.
FIG. 12(b) is a schematic sectional view of the loop antenna having the electromagnetic wave shield, the sheet of magnetic material and the metal plate according to Embodiment 8 thereof.
Figure 12:
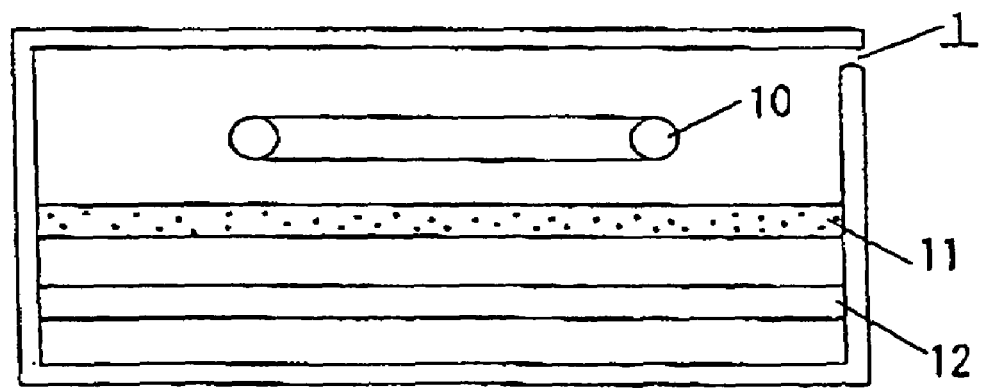

FIG. 12(*a*) is a schematic perspective view of a loop antenna having an electromagnetic wave shield, a sheet of magnetic material and a metal plate according to Embodiment 8 of the invention; and FIG. 12(*b*), a schematic sectional view of the loop antenna having the electromagnetic wave shield, the sheet of magnetic material and the metal plate according to Embodiment 8 thereof.

According to Embodiment 8 of the invention, the comb-shaped electromagnetic wave shield 1 is so disposed as to wrap up the loop antenna 10, the sheet of magnetic material 11 and further the metal plate 12 as shown in FIG. 12(*a*) and FIG. 12(*b*).

In Embodiment 8 of the invention, too, the electromagnetic wave shield 1 is disposed in a different fashion and the rest of the description is similar to that in Embodiment 4 thereof.

EMBODIMENT 9

Figure 13:
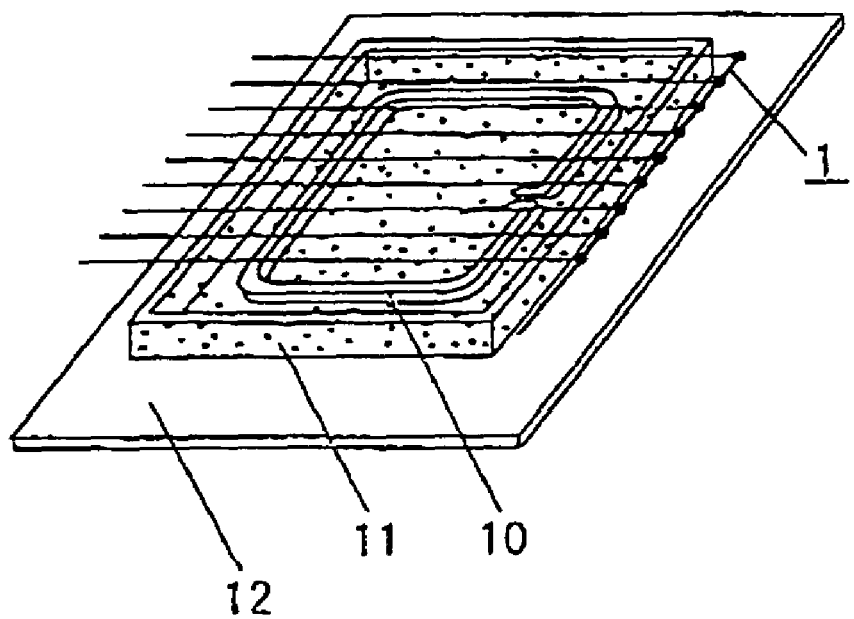
FIG. 13(a) is a schematic perspective view of a loop antenna having an electromagnetic wave shield, a sheet of magnetic material and a metal plate according to Embodiment 9 of the invention.
FIG. 13(b) is a schematic sectional view of the loop antenna having the electromagnetic wave shield, the sheet of magnetic material and the metal plate according to Embodiment 9 thereof.
Figure 13:
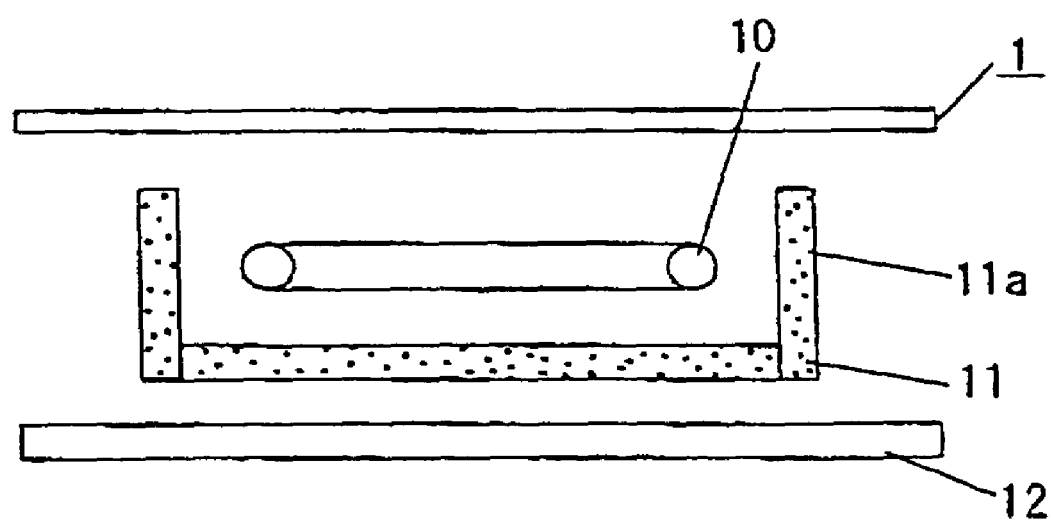

FIG. 13(*a*) is a schematic perspective view of a loop antenna having an electromagnetic wave shield, a sheet of magnetic material and a metal plate according to Embodiment 9 of the invention; and FIG. 13(*b*), a schematic sectional view of the loop antenna having the electromagnetic wave shield, the sheet of magnetic material and the metal plate according to Embodiment 9 thereof.

According to Embodiment 9 of the invention, as shown in FIG. 13(*a*) and FIG. 13(*b*), the comb-shaped electromagnetic wave shield 1 is disposed in front of the loop antenna 10; the sheet of magnetic material 11 is disposed at the back of the loop antenna 10; and the metal plate 12 is disposed at the back of the sheet of magnetic material 11. Moreover, a side wall 11*a* is provided to the sheet of magnetic material 11, whereby the efficiency of the magnetic circuit is improved further. The rest of the description is similar to that in Embodiment 4 of the invention.

EMBODIMENT 10

Figure 14:
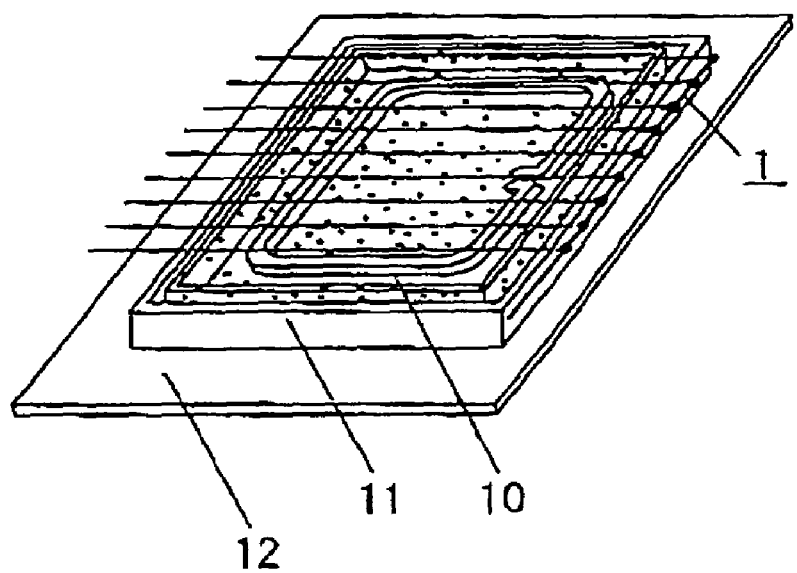
FIG. 14(a) is a schematic perspective view of a loop antenna having an electromagnetic wave shield, a sheet of magnetic material and a metal plate according to Embodiment 10 of the invention.
FIG. 14(b) is a schematic sectional view of the loop antenna having the electromagnetic wave shield, the sheet of magnetic material and the metal plate according to Embodiment 10 thereof.
Figure 14:
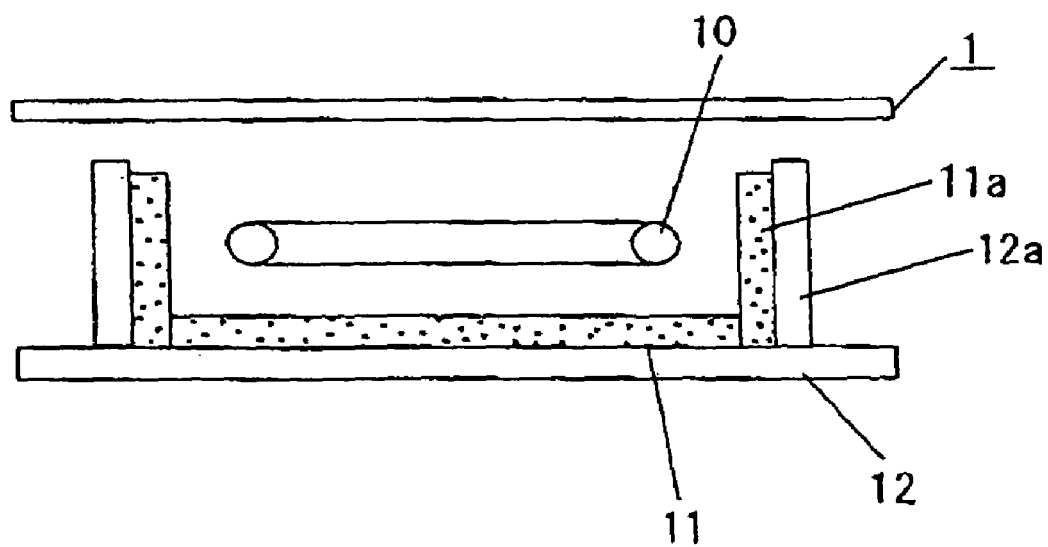

FIG. 14(*a*) is a schematic perspective view of a loop antenna having an electromagnetic wave shield, a sheet of magnetic material and a metal plate according to Embodiment 10 of the invention; and FIG. 14(*b*), a schematic sectional view of the loop antenna having the electromagnetic wave shield, the sheet of magnetic material and the metal plate according to Embodiment 10 thereof.

According to Embodiment 10 of the invention, as shown in FIG. 14(*a*) and FIG. 14(*b*), the comb-shaped electromagnetic wave shield 1 is disposed in front of the loop antenna 10; the sheet of magnetic material 11 is disposed at the back of the loop antenna 10; the metal plate 12 is disposed at the back of the sheet of magnetic material 11; and the side wall 11*a* is provided to the sheet of magnetic material 11. Moreover, a side wall 12*a* is also provided to the metal plate 12, so that a flexible sheet of magnetic material can be held and this results in increasing the mechanical strength. The rest of the description is similar to that in Embodiment 4 of the invention.

EMBODIMENT 11

Figure 15:
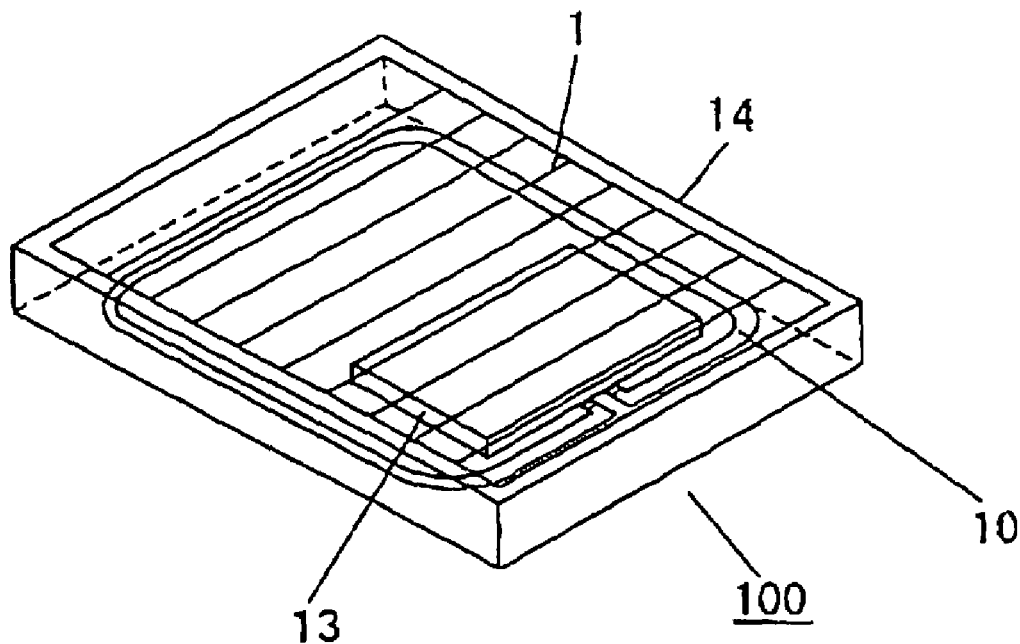
FIG. 15(a) is a schematic perspective view of a contactless IC card read/write apparatus according to Embodiment 11 of the invention.
FIG. 15(b) is a schematic sectional view of the contactless IC card read/write apparatus according to Embodiment 11 thereof.
Figure 15:
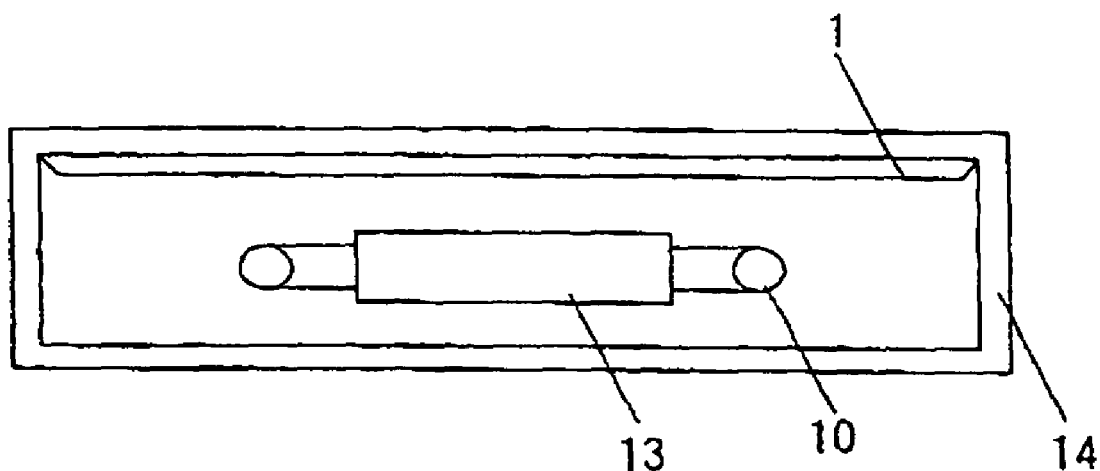

FIG 15(a) is a schematic perspective view of a contactless IC card read/write apparatus according to Embodiment 11 of the invention; and FIG. 15(b), a schematic sectional view of the contactless IC card read/write apparatus according to Embodiment 11 thereof.

In FIG. 15(a) and FIG. 15(b), reference numeral 13 denotes a read/write portion; 14, a casing; and 100, a contactless IC card read/write apparatus.

As shown in 15(a) and FIG. 15(b), the contactless IC card read/write apparatus 100 comprises the loop antenna 10 with the comb-shaped electromagnetic wave shield 1 disposed in front as described in Embodiment 1 of the invention and the read/write portion 13 disposed within the opening of the loop antenna 10, these components being housed in the casing 14 in an integral form. With the integration of the components like this, the contactless IC card read/write apparatus becomes easy to handle and can be installed in various places.

With reference to 15(a) and FIG. 15(b), though a detailed description of the constitution is omitted, the read/write portion 13 is provided with circuits including an oscillation circuit, a power amplifier, a current detection circuit, a control circuit, an antenna regulating circuit, a transmission unit, a reception unit and so forth that are arranged on a printed circuit board. The read/write portion 13 supplies electric power and transmitting data via the loop antenna 10 to the contactless IC card so as to provide communication.

The casing 14 is able to realize weight reduction by using plastics for the body and the advantageous is that when the impedance of the loop antenna 10 is matched with the input/output impedance of the read/write portion 13, any influence of the casing 14 need not be taken into consideration. Moreover, it is preferred for the casing 14 to consist of upper and lower casings because it is easily assembled.

In Embodiment 11 of the invention, there has been shown a case where the loop antenna 10 with the comb-shaped electromagnetic wave shield 1 disposed in front according to Embodiment 1 thereof is used. However, as described in Embodiments 2–10 of the invention, the electromagnetic wave shield 1 may be so configured as to be reticulated or multilayered and the sheet of magnetic material 11 as well as the metal plate 12 may be provided at the back of the loop antenna 10.

Figure 16:
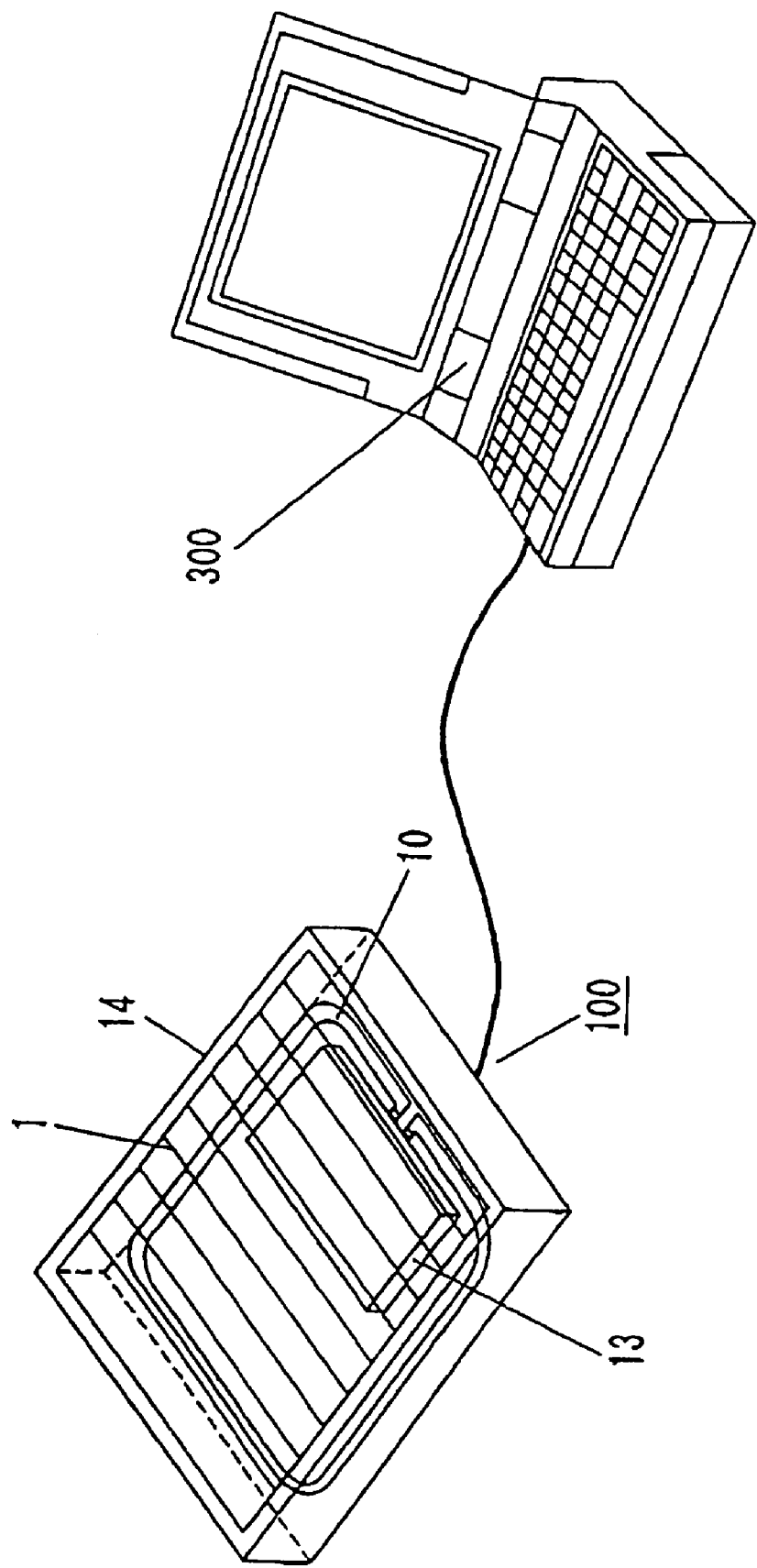
FIG. 16 is a schematic perspective view of a system configuration of a contactless IC card and the contactless IC card read/write apparatus according to Embodiment 11 of the invention.

FIG. 16. is a schematic perspective view of a system configuration of the contactless IC card and the contactless IC card read/write apparatus according to Embodiment 11 of the invention.

In FIG. 16, reference numeral 201 denotes an IC chip; 202, an antenna coil; 200, a contactless IC card; and 300, PC as control equipment.

As shown in FIG. 16, the contactless IC card read/write apparatus 100 communicates with the contactless IC card 200 having the IC chip 201 and the antenna coil 202, sends out electric power and transmitting data regularly or intermittently and obtains receiving data from the contactless IC card 200 within the range of receiving the electric power and the transmitting data by means of the loop antenna 10 of the contactless IC card read/write apparatus 100.

The contactless IC card read/write apparatus 100 according to Embodiment 11 of the invention is so arranged that its loop antenna 10 is equipped with the electromagnetic wave shield 1; that is, the electromagnetic wave shield 1 exists between the contactless IC card 200 and the loop antenna 10. Consequently, as the contactless IC card read/write apparatus is capable of attenuating the distant electric field with the attenuation of the neighboring magnetic flux of the electromagnetic wave restrained, whereby unnecessary measures to counter radiation can readily be taken without shortening the communication distance to the contactless IC card 200. Moreover, the contactless IC card read/write apparatus 100 is able to satisfy the regulations according to the Radio Law.

EMBODIMENT 12

Figure 17:
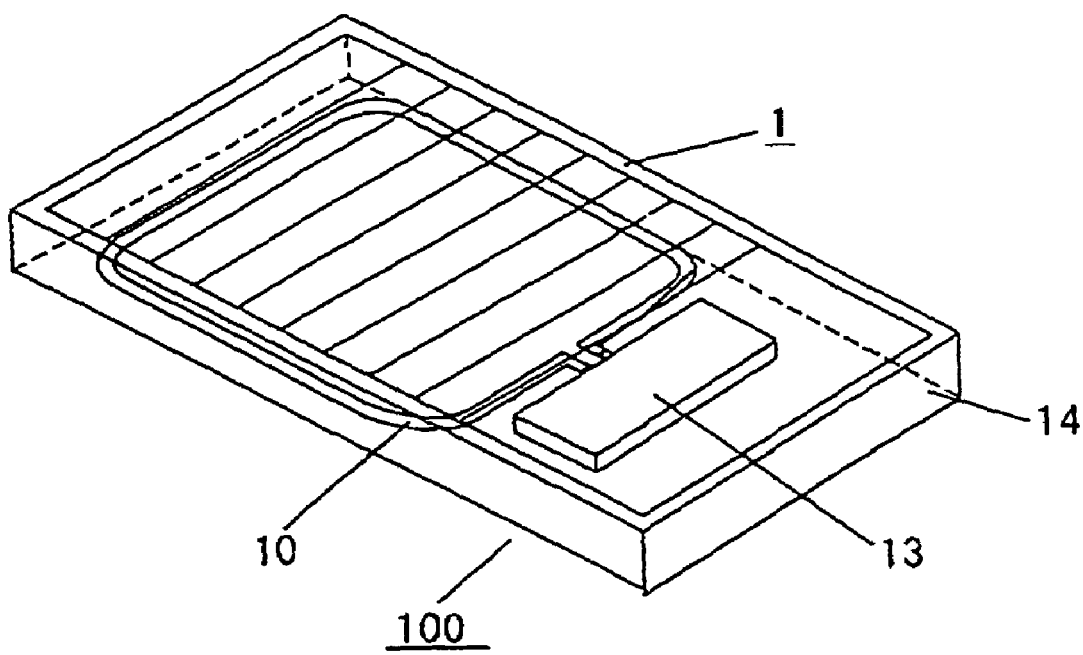
FIG. 17(a) is a schematic perspective view of a contactless IC card read/write apparatus according to Embodiment 12 of the invention.
FIG. 17(b) is a schematic sectional view of the contactless IC card read/write apparatus according to Embodiment 12 thereof.
Figure 17:
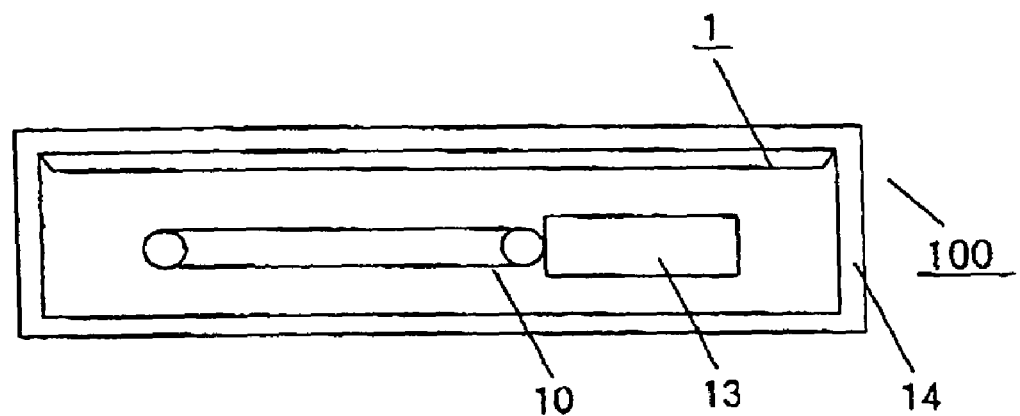

FIG. 17(a) is a schematic perspective view of a contactless IC card read/write apparatus according to Embodiment 12 of the invention; and FIG. 17(b), a schematic sectional view of the contactless IC card read/write apparatus according to Embodiment 12 thereof.

As shown in 17(a) and FIG. 17(b), the contactless IC card read/write apparatus 100 comprises the loop antenna 10 with the comb-shaped electromagnetic wave shield 1 disposed in front as described in Embodiment 1 of the invention and the read/write portion 13 disposed in a position adjacent to the loop antenna 10, these components being housed in the casing 14 in an integral form.

The contactless IC card read/write apparatus can be constituted as shown in 17(a) and FIG. 17(b) and the rest of the description, which is similar to that in Embodiment 11 of the invention, will be omitted.

EMBODIMENT 13

Figure 18:
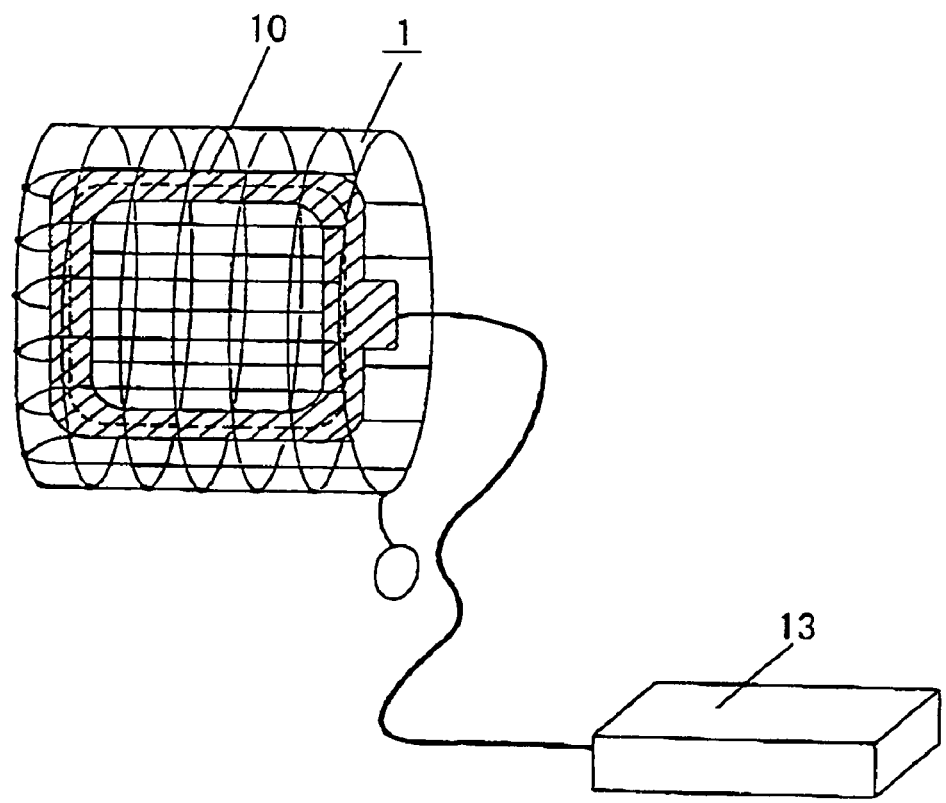
FIG. 18 is a schematic perspective view of a contactless IC card read/write apparatus according to Embodiment 13 of the invention.
Figure 19:
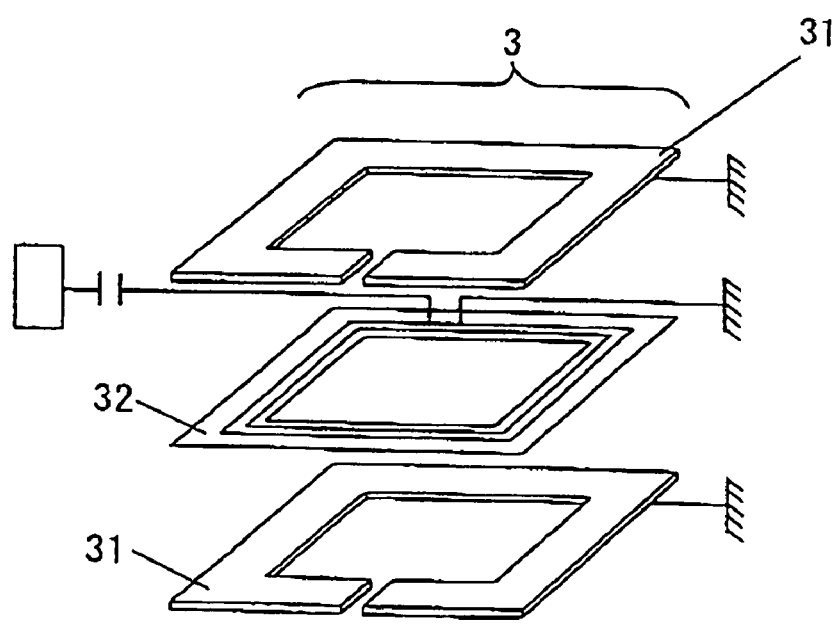
FIG. 19 is a schematic perspective view of a conventional contactless IC card read/write apparatus.

FIG. 18 is a schematic perspective view of a contactless IC card read/write apparatus according to Embodiment 13 of the invention.

As shown in FIG. 18, the contactless IC card read/write apparatus 100 comprises the loop antenna 10 having the envelop-shaped electromagnetic wave shield 1 and the read/write portion 13 connected by a cable to the loop antenna 10.

Although a form of the contactless IC card read/write apparatus with the integrated antenna as described in Embodiments 11 and 12 of the invention is preferred, the arrangement shown in FIG. 18 may also be feasible.

According to the invention, it is possible to provide a loop antenna capable of attenuating the distant electric field with the attenuation of the neighboring magnetic flux restrained since the magnetic coupling of the magnetic flux of the electromagnetic wave emitted from the loop antenna to the electromagnetic wave shield is reducible, and a contactless IC card read/write apparatus.

What is claimed is:

1. A loop antenna having an electromagnetic wave shield over at least one side of the loop antenna, the electromagnetic wave shield comprising:
    a plurality of electric conductors;
    a ground contact, grounding the plurality of electric conductors; and
    a lead wire, connecting the plurality of electric conductors to the ground contact; wherein:
    the plurality of electric conductors are electrically connected via the lead wire to the ground contact and arranged so that the paths of the respective electric conductors from any of their given points to the ground contact via the lead wire are determined uniformly, and
    a sheet of magnetic material is disposed at one side of the loop antenna and the electromagnetic wave shield is disposed at the other side of the loop antenna.

2. The loop antenna as claimed in claim 1, wherein the plurality of electric conductors, the ground contact and the lead wire of the electromagnetic wave shield are provided on a support plate.

3. The loop antenna as claimed in claim 1, wherein the plurality of electric conductors of the electromagnetic wave shield are covered with insulating material.

4. The loop antenna as claimed in claim 1, wherein the plurality of electric conductors of the electromagnetic wave shield are comb-shaped, reticulated or latticed.

5. The loop antenna as claimed in claim 1, wherein the electromagnetic wave shield is envelop-shaped.

6. The loop antenna as claimed in claim 1, wherein the electromagnetic wave shield is multi-layered.

7. The loop antenna as claimed in claim 1, wherein the plurality of electric conductors of the electromagnetic wave shield are so disposed as to wrap up the loop antenna.

8. A loop antenna having an electromagnetic wave shield over at least one side of the loop antenna, the electromagnetic wave shield comprising:
   a plurality of electric conductors;
   a ground contact, grounding the plurality of electric conductors; and
   a lead wire, connecting the plurality of electric conductors to the ground contact, wherein:
   the plurality of electric conductors are electrically connected via the lead wire to the ground contact and arranged so that the paths of the respective electric conductors from any of their given points to the ground contact via the lead wire are determined uniformly,
   a sheet of magnetic material is disposed at the back of the loop antenna facing the electromagnetic wave shield, and
   a side wall in a standing condition on the loop antenna side is provided to the sheet of magnetic material.

9. The loop antenna as claimed in claim 8, wherein a metal plate is disposed at the back of the sheet of magnetic material.

10. The loop antenna as claimed in claim 9, wherein a side wall in a standing condition on the loop antenna side is provided to the metal plate.

11. The loop antenna as claimed in claim 10, wherein a plurality of through-holes are provided in the metal plate.

12. The loop antenna as claimed in claim 1, wherein the ground contact of the electromagnetic wave shield is connected to the ground of the loop antenna.

13. A contactless IC card read/write apparatus comprising the loop antenna as claimed in claim 1 for supplying electric power and transmitting data to a contactless IC card by electromagnetic induction and receiving data from the contactless IC card through load changes, and a read/write apparatus connected to the loop antenna.

14. A contactless IC card read/write apparatus comprising a loop antenna, having an electromagnetic wave shield over at least one side of the loop antenna, for supplying electric power and transmitting data to a contactless IC card by electromagnetic induction and receiving data from the contactless IC card through load changes and a read/write apparatus connected to the loop antenna, the electromagnetic wave shield comprising:
   a plurality of electric conductors;
   a ground contact, grounding the plurality of electric conductors; and
   a lead wire, connecting the plurality of electric conductors to the ground contact; wherein:
   the plurality of electric conductors are electrically connected via the lead wire to the ground contact and arranged so that the paths of the respective electric conductors from any of their given points to the ground contact via the lead wire are determined uniformly, and
   the read/write apparatus is disposed within the opening of the loop antenna and housed in a casing.

15. The contactless IC card read/write apparatus as claimed in claim 13, wherein the read/write apparatus and the loop antenna are disposed next to each other and housed in a casing.

* * * * *